United States Patent [19]

Bernardet et al.

[11] Patent Number: 5,152,956
[45] Date of Patent: Oct. 6, 1992

[54] NEUTRON TUBE COMPRISING AN ELECTROSTATIC ION SOURCE

[75] Inventors: Henri Bernardet, Saint-Michel sur Orge; Xavier L. M. Godechot, Yerres; Claude A. Lejeune, Gif/Yvette, all of France

[73] Assignee: U.S. Philips Corporation, New York, N.Y.

[21] Appl. No.: 416,890

[22] Filed: Oct. 4, 1989

[30] Foreign Application Priority Data

Jul. 10, 1988 [FR] France .................... 88 13188

[51] Int. Cl.⁵ .............................. G21B 1/00
[52] U.S. Cl. ............................. 376/113; 376/116; 376/117
[58] Field of Search .......... 376/108, 113, 114, 116, 376/117

[56] References Cited

U.S. PATENT DOCUMENTS

| | | | |
|---|---|---|---|
| 3,614,440 | 10/1971 | Carr | 376/108 |
| 3,629,588 | 12/1971 | Eyrich | 376/108 |
| 4,298,804 | 11/1981 | Colditz | 376/108 |

Primary Examiner—Brooks H. Hunt
Assistant Examiner—Frederick H. Voss
Attorney, Agent, or Firm—Paul R. Miller

[57] ABSTRACT

A sealed neutron tube is set forth, containing a low-pressure gaseous deuterium-tritium mixture wherefrom an ion source (13) forms an ion beam which traverses an acceleration electrode (17) and is projected with high energy onto a target (16) in order to produce therein a fusion reaction which causes an emission of neutrons. In accordance with the invention, the ion source comprises a cold cathode with strictly electrostatic confinement of ionizing electrons; this is achieved by using an anode which is connected to a positive potential and which has a weakly collective surface facing the repulsive surface of the cathode cavity; the anode is arranged along the axis of the cavity in which it is arranged; said cavity constitutes the internal part of the cathode (15) in which the electrons ($e_2$) which oscillate along very long paths in comparison with the dimensions of the cathode cavity ionize the gas and form an ionized gas wherefrom the ion beam (22) is extracted for standard ion optical device (17).

17 Claims, 4 Drawing Sheets

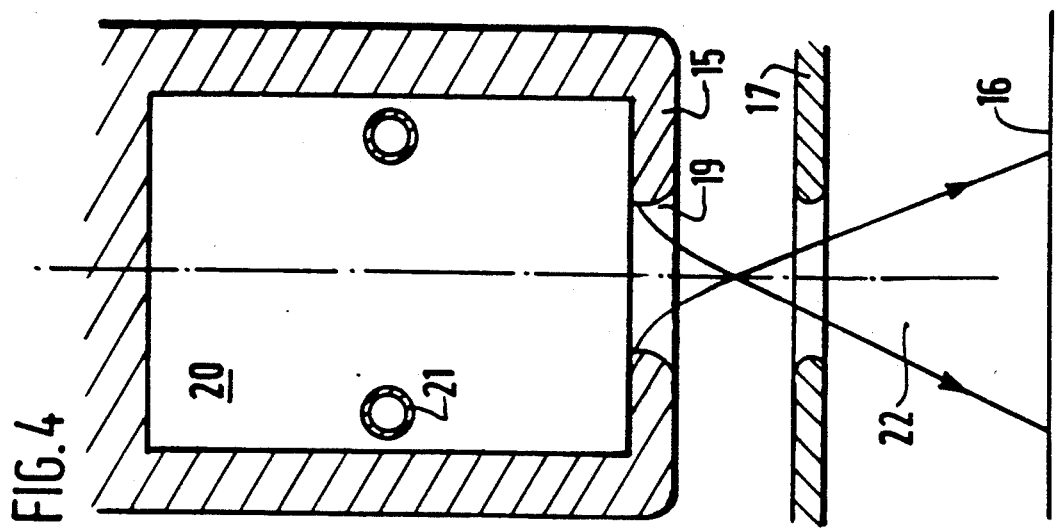
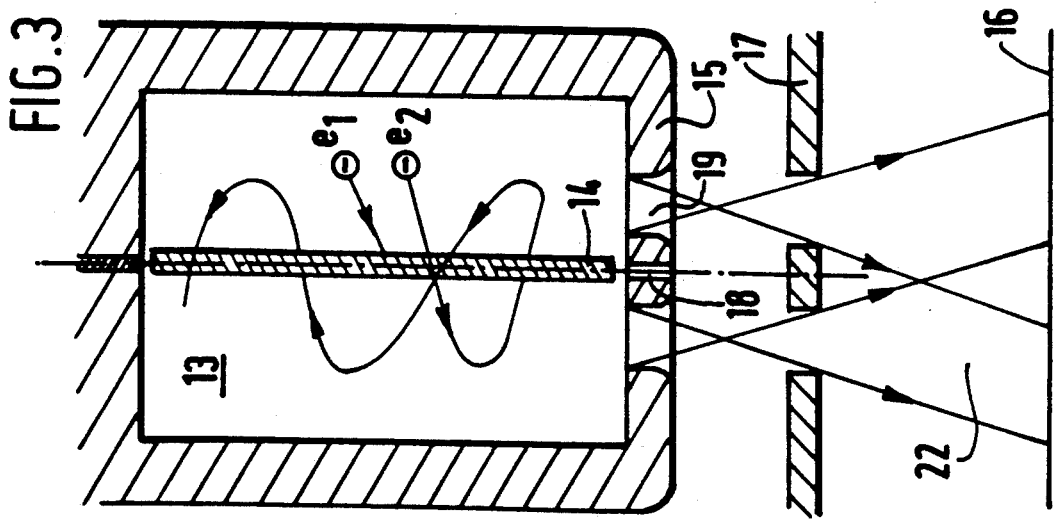

NEUTRON TUBE COMPRISING AN ELECTROSTATIC ION SOURCE

The invention relates to a neutron tube, containing a low-pressure gaseous deuterium-tritium mixture room for generating an ion beam and an acceleration electrode for projecting the ion beam with high energy onto a target electrode in order to produce therein a fusion reaction to cause emission of neutrons.

Neutron tubes of this kind are used in techniques for the examination of substances by fast, thermal, epithermal or cold neutrons: neutronography, analysis by activation, analysis by spectrometry of inelastic diffusions, or radiative captures, diffusion of neutrons etc.

In order to make these nuclear techniques as effective as possible, longer tube service lifes are required for the corresponding emission levels.

The fusion reaction $d(3_H, 4_{He})n$ which supplies 14 MeV neutrons is most commonly used because of its large effective cross-section for comparatively low ion energies. However, regardless of the reaction used, the number of neutrons obtained per unit of charge in the beam always increases in proportion to the increase of the energy of the ions directed towards a thick target, that is to say mainly beyond ion energies obtained in for example sealed tubes which are available at present and which are powered by a high voltage do not exceed 250 kV.

Erosion of the target by ion bombardment is one of the principal factors restricting the working life of a neutron tube.

The erosion is a function of the chemical nature and the structure of the target on the one hand, and of the energy of the incident ions and their density distribution profile on the surface of impact on the other hand.

In most cases the target is formed by a hydride (titanium, scandium, zirconium, erbium, etc.) which is capable of binding and releasing large quantities of hydrogen without substantially affecting its mechanical strength; the total quantity bound is a function of the temperature of the target and of the hydrogen pressure in the tube. The target materials used are deposited in the form of thin layers whose thickness is limited by the problems imposed by the adherence of the layer to its substrate. One way of retarding the erosion of the target, for example, is to construct the absorbing active layer as a stack of identical layers which are isolated from one another by a diffusion barrier. The thickness of each of the active layers is in the order of magnitude of the penetration depth of deuterium ions striking the target.

Another method of protecting the target, thus increasing the service life of the tube, consists in influencing of the ion beam so as to improve its density distribution profile on the surface of impact. For a constant total ion current on the target electrode, leading to a constant neutron emission, this improvement will result in an as uniform as possible distribution of the current across the entire target surface exposed to the ion bombardment.

The known neutron tubes generally use Penning-type ion sources which offer the advantage that they are robust, have a cold cathode (and hence a long service life), supply large discharge currents for low pressures (in the order of 10 A/torr), and have a high extraction yield (from 10 to 40%) and small dimensions.

This type of source, however, has the drawback that it necessitates the use of a magnetic ion confinement field in the order of a thousand gauss which introduces a substantial inhomogeneity of the ion density inside the discharge. Moreover, the magnet system producing this field is intricate and heavy.

It is the object of the invention to provide a simpler ion source which is less expensive and less heavy.

To achieve this, in accordance with the invention the ion source comprises a cold cathode and electrostatic means for ionising action with electrons, which is provided with an anode positioned inside a cathode cavity having and has a weakly collective surface facing said cathode cavity, where electrons to be emitted by the cathode or created in the cavity and for which the probability of interception by the anode is strongly reduced oscillate around the anode along paths which are relatively long, enabling the creation of an ionised deuterium-tritium gas wherefrom ions are extracted, via one (or more) emission orifices formed in the cathode wall facing the target electrode, by means of an extraction-acceleration system.

These electrostatic ion sources which preferably do not involve a magnetic field have a simpler design and application than the Penning-type sources.

In a preferred embodiment the anode is formed by a cylindrical rod of small diameter which is arranged along the axis of the cathode cylinder.

A further embodiment comprises a multiplicity of ionising cells. The anode can be ring-shaped around the axis of the cathode and having cross-section of small dimensions. The anode can be hollow in order to be traversed by a cooling liquid.

The invention will be described in detail hereinafter, by way of example, with reference to the accompanying diagrammatic drawings.

FIGS. 3 and 4 show two embodiments of neutron tubes in accordance with the invention.

Figure 1:
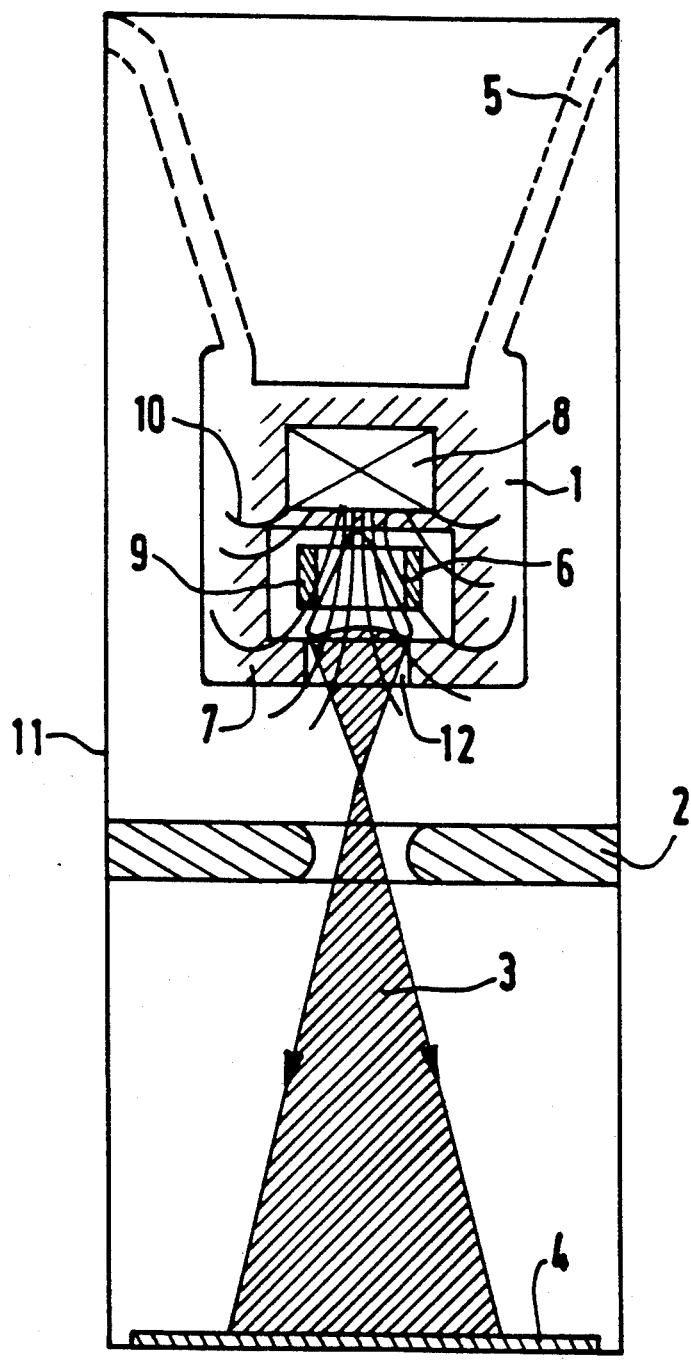
FIG. 1 shows the circuit diagram of a prior art sealed neutron tube.

FIG. 1 shows the basic elements of a sealed neutron tube 11 which contains a low-pressure gaseous mixture to be ionised, for example deuterium-tritium, and which comprises an ion source 1 and an acceleration electrode 2 wherebetween a very high potential difference exists which enables the extraction and acceleration of the ion beam 3 and its projection onto the target electrode 4 where the fusion reaction takes place which causes an emission of neutrons of, for example, 14 MeV.

The ion source 1 is integral with an insulator 5 for the passage of the high voltage power supply connector (not shown) and is a Penning-type source which is formed, for example, by an cylindrical anode 6, a cathode structure 7 which incorporates a magnet 8 with an axial magnetic field which confines the ionised gas 9 to the vicinity of the axis of the anode cylinder and whose lines of force 10 exhibit a given divergence. An ion emission channel 12 is formed in the cathode structure so as to face the anode.

The diagrams of FIG. 2 illustrate the target erosion effects.

Figure 2A:
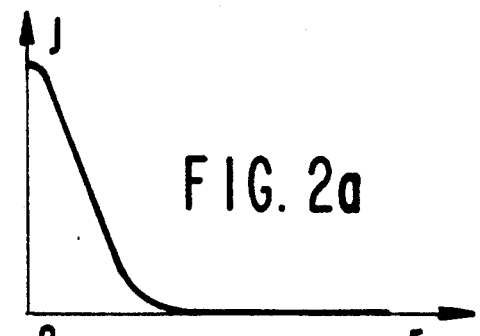
FIGS. 2a, 2b, 2c and 2d show the erosion effects in the depth of the target and the radial ion bombardment density profile.

FIG. 2a shows the density profile J of the ion bombardment in an arbitrary radial direction Or, starting from the point of impact O of the central axis of the beam on the surface of the target electrode for a standard ion optical system comprising a single electrode.

The shape of this profile illustrates the inhomogeneous character of this beam where the very high density in the central part decreases rapidly towards the periphery.

Figure 2B:
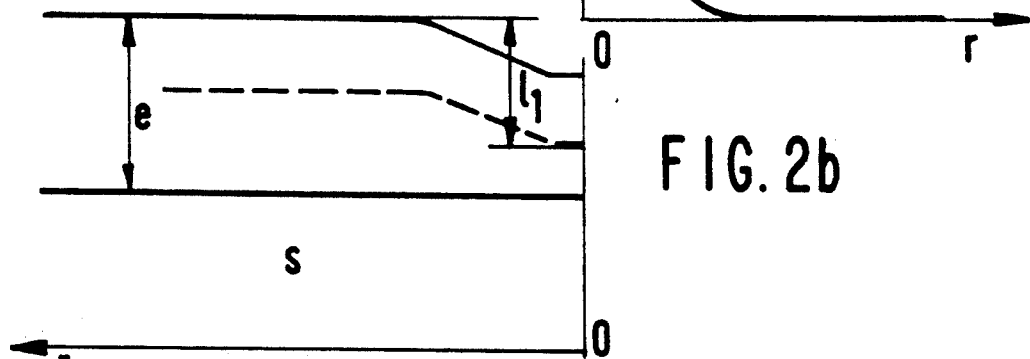

FIG. 2b shows the erosion as a function of the bombardment density and the entire hydride layer having a thickness e and deposited on a substrate S is saturated with the deuterium-tritium mixture. The penetration depth of the energetic deuterium-tritium ions, denoted by a broken line, equals a depth $l_1$ as a function of this energy.

Figure 2C:
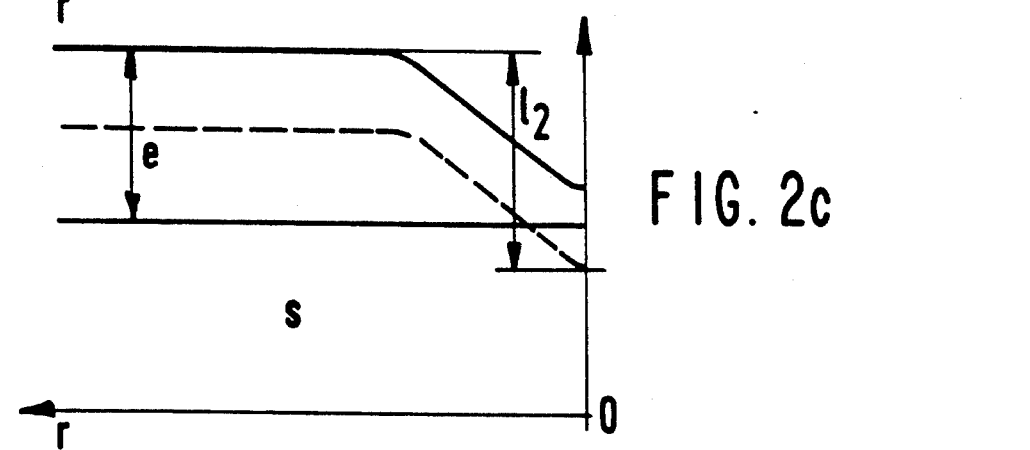

In FIG. 2c the erosion of the layer is such that the penetration depth $l_2$ is greater than the thickness e in the most heavily bombarded zone; a part of the incident ions propagates in the substrate and the deuterium and tritium atoms are very quickly oversaturated.

Figure 2D:
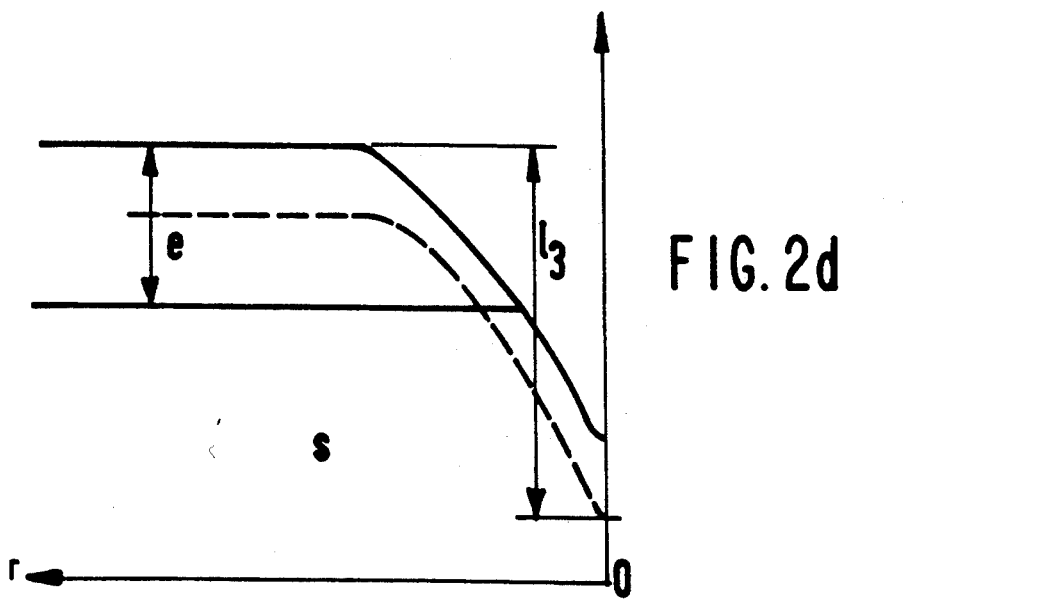

In FIG. 2d the deuterium and tritium atoms collect and form bubbles which form craters upon bursting and which very quickly increase the erosion of the target at the depth $l_3$.

The latter process immediately precedes the end of the service life of the tube, causing either a drastic increase of breakdowns (presence of microparticles resulting from the bursting of bubbles) or pollution of the target surface by the pulverised atoms which absorb the energy of incident ions.

Figure 5:
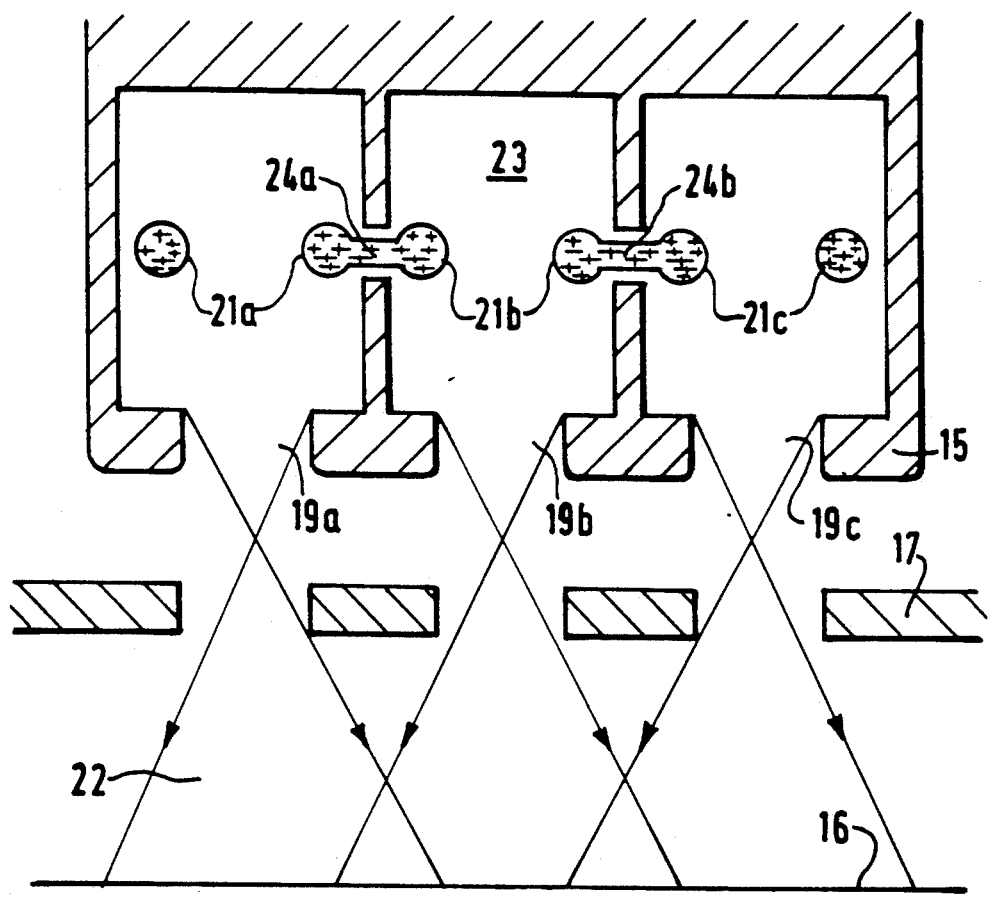
FIG. 5 shows a multi-cell structure.

Identical elements are denoted by corresponding reference numerals in the FIGS. 3, 4 and 5.

The embodiment shown in FIG. 3 comprises an ion source 13 of the type with electrostatic confinement, consisting of an anode 14, a cathode 15, the ions being projected onto a target 16 via acceleration electrode 17 carrying a suitable potential.

The cathode 15 is shaped as a cylindrical cavity which is connected to +250 kV with respect to the target 16. The anode 14 is arranged along the axis of this cavity and traverses the cathode structure by way of the insulating passages 18 and is formed by a cylindrical rod which has a very small diameter and which is connected to a positive potential of from 5 to 10 kV with respect to the cathode.

The electrons originating from the cathode or created in the volume of the cathode cavity are accelerated by the electric field created by the anode; however, because this anode has very small dimensions the probability of interception of an electron such as $e_1$ is strongly reduced so that the majority of the electrons which thus miss the anode, such as $e_2$, will follow very long paths around the anode during which they ionise the gaseous deuterium-tritium mixture which is enclosed in the neutron tube under a low pressure, thus forming an ionised gas.

The ions are extracted from the gas thus ionised via emission orifices 19 which are formed in the wall of the cathode and wherefrom the ion beams 22 are projected with a high energy onto the target 16 by means of the acceleration electrode 17.

This axial source structure is referred to as an "orbitron" type.

FIG. 4 shows a further embodiment of the neutron tube, comprising an ion source 20 which is still of the electrostatic confinement type but which comprises a toric anode 21 enabling axial extraction of ions.

As before, in this type of source the cathode 15 is formed by a cylindrical cavity whose axis of symmetry is the same as that of the toric anode 21 having a very small cross section; the anode may be hollow in order to be traversed by a cooling liquid and its position and dimensions having to be optimised.

The ions are extracted from the orifice 19 formed in the cathode, thus serving as an emission electrode, by means of the acceleration electrode 17 which is connected to the potential 0, like the target 16.

The emission orifices are formed in the homogeneous regions of the discharge in order to extract a homogeneous ion beam therefrom.

In these circumstances the ion beam or beams bombarding the target is or are homogeneous and the service life of the tube is increased.

Qualitatively speaking the operating principle is the same as that of the device which is shown in FIG. 3 and which comprises an axial anode.

FIG. 5 is a sectional view of an ion source having a multi-cell structure 23, comprising an arrangement of elementary sources of the toric anode type, such as 21a, 21b and 21c and corresponding orifices such as 19a, 19b and 19c. The anode tores are connected to one another by connections such as 24a, 24b which extend through the cathode walls.

In comparison with an ion source with magnetic confinement, a source with electrostatic confinement offers the advantages that its weight is lower, that it is less complex and less expensive for a substantially equal service life, both types of structure also being robust and both using the cold cathode principle, thus ensuring a good service life. Until now this type of structure has not yet been studied for optimization as exhaustively as the Penningtype magnetic structure has been, so that at present the emission yield is slightly less attractive than that of a Penning structure of the same proportions, but on the one hand an optimum compromise must yet be found between weight and cost price, and on the other hand optimisation of the dimensions, shape and position of the anode and the cathode chamber will open the way to real competitiveness of this structure.

We claim:

1. A neutron tube comprising an enclosed structure including in sequence
   (a) chamber means containing a low-pressure gaseous deuterium-tritium mixture for generating an ion beam,
   (b) acceleration electrode means for projecting said ion beam, and
   (c) target electrode means for receiving said ion beam to produce a fusion reaction to cause emission of neutrons,
   wherein said chamber means includes a hollow cathode structure forming a cathode cavity aligned on an axis with said acceleration electrode means and said target electrode means, electrostatic means for ionizing said gaseous mixture with electrons, said electrostatic means including an anode structure positioned inside said cathode cavity relative to said axis, and orifice means disposed on a wall of said cathode structure facing said target electrode means for extracting ions from said cathode structure with said acceleration electrode means, said orifice means including at least one emission orifice.

2. A neutron tube according to claim 1, wherein said cathode cavity is cylindrical and said anode structure is disposed along said axis.

3. A neutron tube according to claim 2, wherein said anode structure is a cylindrical rod extending along said axis, said cylindrical rod having a diameter permitting a majority of electrons formed in said hollow cathode structure to follow a path missing said cylindrical rod.

4. A neutron tube according to claim 2, wherein said orifice means includes a plurality of emission orifices.

5. A neutron tube as claimed in claim 2, wherein said chamber means is a multi-cell type structure.

6. A neutron tube according to claim 3, wherein said diameter has a dimension that strongly reduces probability of said electrons from striking said cylindrical rod.

7. A neutron tube according to claim 3, wherein said cylindrical rod is connected to a positive potential of from 5 to 10 kV relative to said hollow cathode structure.

8. A neutron tube according to claim 6, wherein said ions are projected onto said target electrode means at a potential of +250 kV.

9. A neutron tube as claimed in claim 1, wherein said anode is circularly symmetrical around the axis of said cathode cavity.

10. A neutron tube as claimed in claim 9, wherein said anode is a toric anode disposed to provide axial extraction of said ions.

11. A neutron tube as claimed in claim 9, wherein said chamber means is a multi-cell type structure.

12. A neutron tube as claimed in claim 10, wherein said toric anode has the same axis of symmetry as said cathode cavity.

13. A neutron tube as claimed in claim 12, wherein said electrons are extracted from said cathode cavity in a homogeneous ion beam.

14. A neutron tube as claimed in claim 1, wherein said chamber means is a multi-cell type structure.

15. A neutron tube as claimed in claim 14, wherein said anode has an anode portion in each cell of the multi-cell structure, and wherein each anode portion is connected to adjacent anode portions through walls of said multi-cell structure.

16. A neutron tube as claimed in claim 15, wherein each anode portion is a toric anode.

17. A neutron tube as claimed in claim 15, wherein each anode portion is a cylindrical rod extending along an axis of each cell.

* * * * *